| United States Patent [19] | [11] 3,914,167 |
|---|---|
| Ivy et al. | [45] Oct. 21, 1975 |

[54] PROCESS FOR MAKING CIS-1,3-DICHLOROPROPENE

[75] Inventors: John B. Ivy; Gordon G. Willis, both of Lake Jackson; David C. Kelsoe, Clute, all of Tex.

[73] Assignee: The Dow Chemical Company, Midland, Mich.

[22] Filed: Aug. 26, 1974

[21] Appl. No.: 500,825

[52] U.S. Cl............ 204/163 R; 203/38; 260/654 H
[51] Int. Cl.$^2$....................... B01J 1/10; C07C 21/04
[58] Field of Search.................. 203/38; 204/163 R; 260/654 H

[56] References Cited
UNITED STATES PATENTS

| 3,637,479 | 1/1972 | Rosenberg et al. | 204/163 R |
|---|---|---|---|
| 3,674,665 | 7/1972 | Cristol et al. | 204/163 R |
| 3,849,513 | 11/1974 | Doyle | 260/654 R |

*Primary Examiner*—Leland A. Sebastian
*Attorney, Agent, or Firm*—Chessie E. Rehberg

[57] ABSTRACT cis-1,3-Dichloropropene is made from the still-bottoms from the manufacture of allyl chloride by a process comprising a. selective chlorination or bromination of the $C_6$ olefin component in the still-bottoms and then b. separating the cis-1,3-dichloropropene from higher-boiling components by fractional distillation, the trans isomer being simultaneously or subsequently isomerized to the cis and similarly separated, thus recovering substantially all of the 1,3-dichloropropene as the cis isomer.

6 Claims, No Drawings

PROCESS FOR MAKING CIS-1,3-DICHLOROPROPENE

BACKGROUND OF THE INVENTION

The 1,3-dichloropropenes (hereinafter DCP) are widely used as nematocides, usually in the form of a crude mixture containing about 60–95 percent DCP in the form of the equilibrium mixture of cis and trans isomers (about 50:50). Since the cis isomer is known to be about twice as active as a nematocide as is the trans isomer, it would be desirable to produce purer DCP having a higher content of the cis isomer. While it is known that the cis isomer is slightly more volatile than the trans, and therefore should be separable by careful fractional distillation, it has been found that both this distillation and any subsequent isomerization of the trans isomer are greatly impeded by the presence in the still-bottoms of a small proportion (usually 1–5 percent) of $C_6$ olefin components that boil very close to the DCP fraction. The term "$C_6$ olefin" as used herein includes not only the mono- and di-olefinic hydrocarbons but also such olefins having one or more chlorine substituents.

Cheves Walling, in his book "Free Radicals in Solution," John Wiley, N.Y., 1957, at page 302, has reported that many cis, trans isomeric compounds can be isomerized to an equilibrium mixture by contact with bromine or iodine free radicals, such as are generated by exposure of $Br_2$ or $I_2$ to actinic light, e.g., UV light.

SUMMARY OF THE INVENTION

According to the invention, 1,3-dichloropropene (DCP) containing a high proportion of the cis isomer is obtained from still-bottoms from the production of allyl chloride by a process comprising
  a. selectively chlorinating or brominating the $C_6$ olefin component of the still-bottoms and
  b. separating the cis-DCP from the higher-boiling components by fractional distillation, the trans isomer being concurrently or subsequently isomerized to produce more cis which is then similarly separated, thus converting substantially all of the DCP into the cis isomer.

DETAILED DESCRIPTION OF THE INVENTION

Allyl chloride is made commercially by the chlorination of propylene. Among the byproducts of this process are polychlorinated propanes and propenes which, after distillation of allyl chloride, are left as a still-bottoms mixture. This, or a crude distillate fraction thereof, is the raw material used in the present process. Such a distillate fraction is now marketed for use as a soil fumigant for killing nematodes and other pests. These materials typically contain as major components propylene dichloride and cis- and trans-1,3-DCP. They also contain $C_6$ olefins which must be removed or inactivated before the subsequent steps of the present process can be conducted efficiently. Other undesirable, though less objectionable, impurities can also be at least partially removed by the same treatment if desired.

The $C_6$ olefins, and optionally other impurities, are removed by first reacting them with elemental chlorine or bromine and then separating the thus-formed products by distilling the DCP fraction therefrom. In this selective halogenation step, the amount of halogen used should be at least one mole per mole of $C_6$ olefin to be reacted but any excess thereover should preferably not exceed about 10 mole percent based on the DCP components in the feed because larger amounts would react to some extent with the DCP, thus reducing the yield of desired product.

The selective halogenation reaction proceeds rapidly at ambient temperature and atmospheric pressure, being essentially complete in a few minutes, especially when the halogen used is chlorine. When using chlorine, exposure to actinic light during the reaction is undesirable because it may cause substitution chlorination. When using bromine this is less likely to occur. Moreover, bromine and/or brominated products under actinic light produces bromine free radicals, which are effective catalysts for the cis- and trans-isomerization of DCP. Accordingly, it is possible to combine the bromination of $C_6$ olefins, isomerization of trans-DCP to the cis isomer and the separation of the cis-DCP into a single operation by use of a reactor-still apparatus wherein the bromination under actinic light can be carried on concurrently with distillation of the cis-DCP.

In an alternative but similar procedure, the selective halogenation can be effected before the material reaches the isomerization-distillation unit. This can conveniently be done, especially when using chlorine, by simply combining the feedstock and chlorine streams on their way to the reactor-still and providing a few minutes holding time along the way.

In still another alternative procedure, the selective halogenation reaction is completed, the material is fractionally distilled to remove the cis- but not the trans-DCP, the latter is then subjected to isomerization conditions to convert it essentially to the equilibrium cis-trans mixture, this mixture is recycled to the distillation unit, etc., until essentially all of the DCP has been converted to the cis form.

The isomerization of trans-DCP to the equilibrium cis-trans mixture is catalyzed by certain free radicals. Bromine and iodine free radicals are particularly effective. They can be generated in several known ways, the most convenient being the UV irradiation of elemental $BR_2$ or $I_2$. Various organic peroxides are also known generators of free radicals. Only a small, catalytic amount of the free radical source is needed. Thus, when using $Br_2$ as the source, as little as 0.0001 mole percent, based on DCP, is effective, though the presence of impurities that act as chain-stoppers may necessitate more. Usually it is preferred to use about 0.05 to 0.5 mole percent, though more can be used if desired.

The temperature at which the isomerization is effected may be varied widely so long as the material does not suffer thermal decomposition. Suitable temperatures may range from $-20°$ to $150°C$., though about $25°-80°$ is preferred. Pressure is not significant, though preferably the material should be kept liquid; i.e., the pressure preferably should be at least equal to the autogeneous pressure of the reaction mixture.

The isomerization proceeds rapidly under suitable conditions, as little as one minute of reaction time being sufficient under optimum conditions. More commonly, about 0.5–2 hours are needed while under unfavorable conditions as much as 15 hours or more may be needed.

In practicing the invention on a commercial scale it is preferred to operate the process continuously rather than in a batchwise fashion. Such an operation may suitably comprise the following steps and features, though some of them are obviously optional.

The crude still-bottoms from the allyl chloride process are mixed with enough $Cl_2$ or $Br_2$ to react with all the $C_6$ olefins and then passed through a fractionating column in which any light components distilling below DCP are removed. The material may next be passed through a second column whereby the DCP is taken overhead and fed to a third column which takes the cis isomer overhead. Most of the down-flow near the bottom of this column is withdrawn, sent through an isomerization reaction wherein it is mixed with a catalytic amount of $Br_2$ or $I_2$ and subjected to UV radiation and is then returned to the same column near its top. The bottoms from the third column are withdrawn and fed to a stripper column from which any residual DCP or other values are recovered. Thus, a predominant proportion of the DCP appears in the distillate from the third column and may contain little of the trans isomer, depending on the efficiency of the column and the desires of the operator.

SPECIFIC EMBODIMENT OF THE INVENTION

The results obtained in the operation of a pilot plant scale continuous operation essentially as described above are summarized in the following table. The analyses of the feed stream and product stream are shown as percent by weight.

| Component | Feed | Product |
|---|---|---|
| cis-DCP | 26.67 | 98.94 |
| trans-DCP | 23.53 | .16 |
| Other chlorinated propenes | 14.91 | .17 |
| Propylene dichloride | 24.96 | .51 |
| $C_6$ Olefins | 6.49 | .13 |
| Misc. | 3.44 | .09 |

In the above example the crude feed was selectively chlorinated with 3.07 percent of its weight of elemental chlorine by mixing the two in the dark at 25°C. and atmospheric pressure. In the isomerization reactor the material was mixed with 0.3 percent of its weight of bromine at 40°C. and atmospheric pressure. The overall recovery of DCP from feed to produce was 95.9 percent.

We claim

1. The process of making 1,3-dichloropropene consisting predominantly of the cis isomer from the still-bottoms from the production of allyl chloride by the chlorination of propylene, said process comprising
   a. selectively halogenating the $C_6$ olefin components of the still-bottoms by reaction with elemental chlorine or bromine and
   b. separating the cis-1,3-dichloropropene by distillation from the halogenated still-bottoms and concurrently or subsequently isomerizing the trans-1,3-dichloropropene in the halogenated still-bottoms to form essentially the equilibrium mixture of cis- and trans-1,3-dichloropropene and separating the cis isomer from the mixture and continuing such isomerization and separation until the desired conversion of trans- to cis-1,3-dichloropropene has been achieved.

2. The process of claim 1 wherein the halogen used in (a) is chlorine.

3. The process of claim 1 wherein the isomerization in (b) is catalyzed by contact with elemental bromine or iodine in combination with actinic radiation.

4. The process of claim 3 wherein the catalyst is bromine.

5. The process of claim 1 wherein the $C_6$ olefin content of the still-bottoms is chlorinated by contacting the still-bottoms at about 25°C. and in the substantial absence of actinic light with an amount of elemental chlorine at least stoichiometrically equivalent to the $C_6$ olefin content of the still-bottoms but any excess thereover not exceeding about 10 mole percent, based on the 1,3-dichloropropene present, the cis-b 1,3-dichloropropene is separated from the trans isomer, the latter is isomerized to the equilibrium cis-trans mixture by contacting it at about 25°–80°C. with a catalytic amount of bromine while irradiating it with ultraviolet light, the cis isomer is separated from the equilibrium mixture and the isomerization and separation steps are repeated until the desired ratio of cis to trans isomer is reached.

6. The process for removing 1,3-dichloropropene from the still-bottoms from the production of allyl chloride by the chlorination of propylene, said process comprising reacting by contacting the still-bottoms with elemental chlorine or bromine in an amount at least stoichiometrically equivalent to the $C_6$ olefin content of the still-bottoms but any excess thereover being not more than 10 mole percent of the 1,3-dichloropropene content of the still-bottoms, and then distilling the 1,3-dichloropropene from the chlorinated still-bottoms.

* * * * *

UNITED STATES PATENT AND TRADEMARK OFFICE
CERTIFICATE OF CORRECTION

PATENT NO. : 3,914,167
DATED : October 21, 1975
INVENTOR(S) : John B. Ivy; Gordon G. Willis; David C. Kelsoe It is certified that error appears in the above-identified patent and that said Letters Patent are hereby corrected as shown below:

Column 2, line 58, "autogeneous" should read --autogenous--;

Column 3, line 45, "produce" should read --product--;

Column 4, line 29, "cis-b" should read --cis- --.

Signed and Sealed this eighteenth Day of May 1976

[SEAL]

Attest:

RUTH C. MASON
Attesting Officer

C. MARSHALL DANN
Commissioner of Patents and Trademarks